No. 828,284. PATENTED AUG. 7, 1906.
T. H. GLASSCOE.
CARBURETER.
APPLICATION FILED FEB. 2, 1906.

3 SHEETS—SHEET 1.

Attest
L. B. Middleton
Edward N. Carton

Inventor
Thomas H. Glasscoe
by Spear, Middleton, Donaldson & Spear
Attys.

No. 828,284. PATENTED AUG. 7, 1906.
T. H. GLASSCOE.
CARBURETER.
APPLICATION FILED FEB. 2, 1906.

3 SHEETS—SHEET 2.

No. 828,284. PATENTED AUG. 7, 1906.
T. H. GLASSCOE.
CARBURETER.
APPLICATION FILED FEB. 2, 1906.

3 SHEETS—SHEET 3.

Attest
L. B. Middleton
Edward N. Sarton

Inventor
Thomas H. Glasscoe
by Spear, Middleton, Donaldson & Spear
Attys.

UNITED STATES PATENT OFFICE.

THOMAS HENRY GLASSCOE, OF WANSTEAD, ENGLAND.

CARBURETER.

No. 828,284.
Specification of Letters Patent.
Patented Aug. 7, 1906.

Application filed February 2, 1906. Serial No. 299,210.

*To all whom it may concern:*

Be it known that I, THOMAS HENRY GLASSCOE, a subject of the King of Great Britain and Ireland, residing at Ivydale, Herongate Road, Wanstead, in the county of Essex, England, have invented certain new and useful Improvements in and Relating to Carbureters, of which the following is a specification.

The invention consists in the features and combination and arrangement of parts hereinafter described, and particularly pointed out in the claims.

Figure 1:
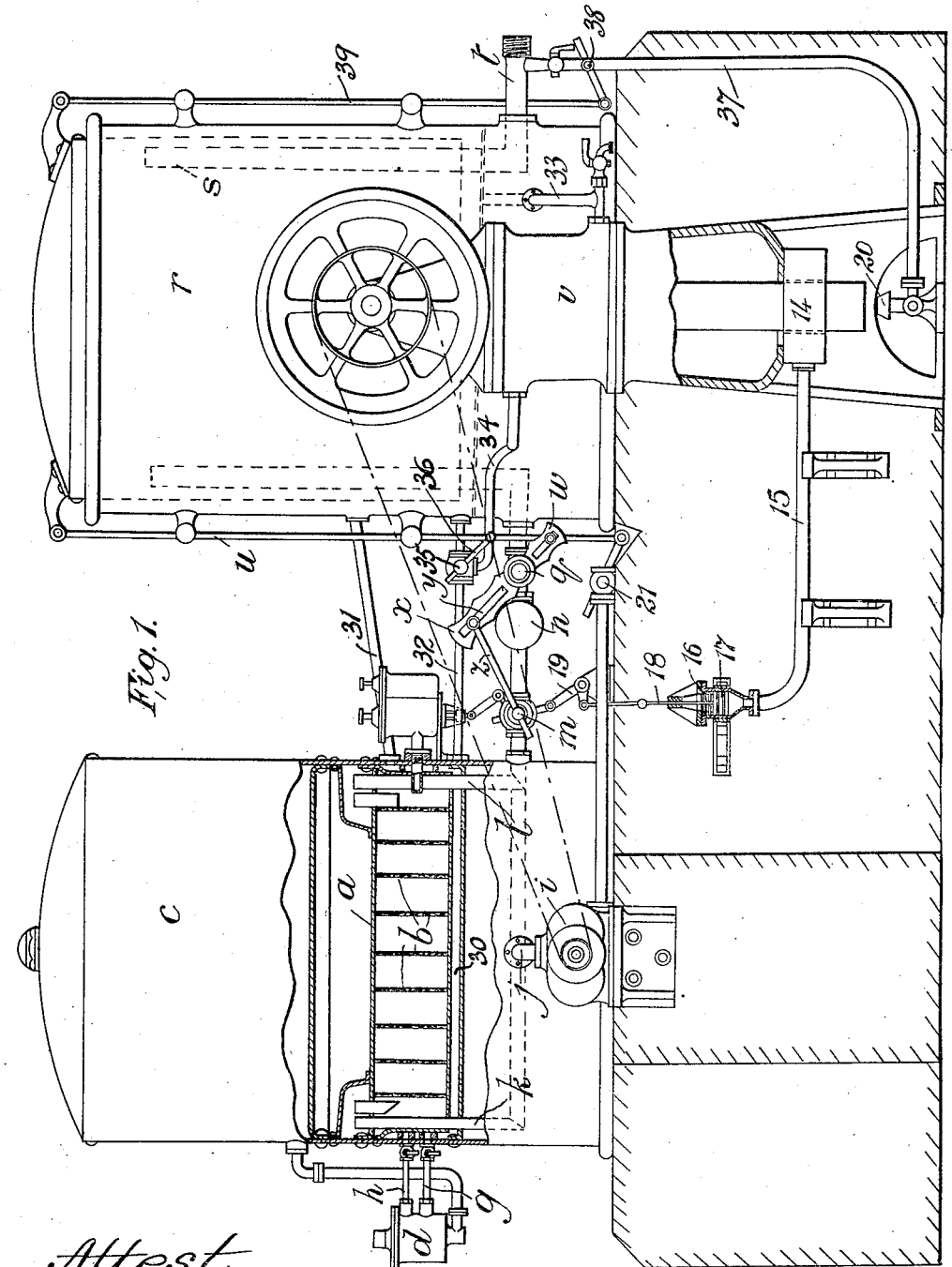
Figure 2:
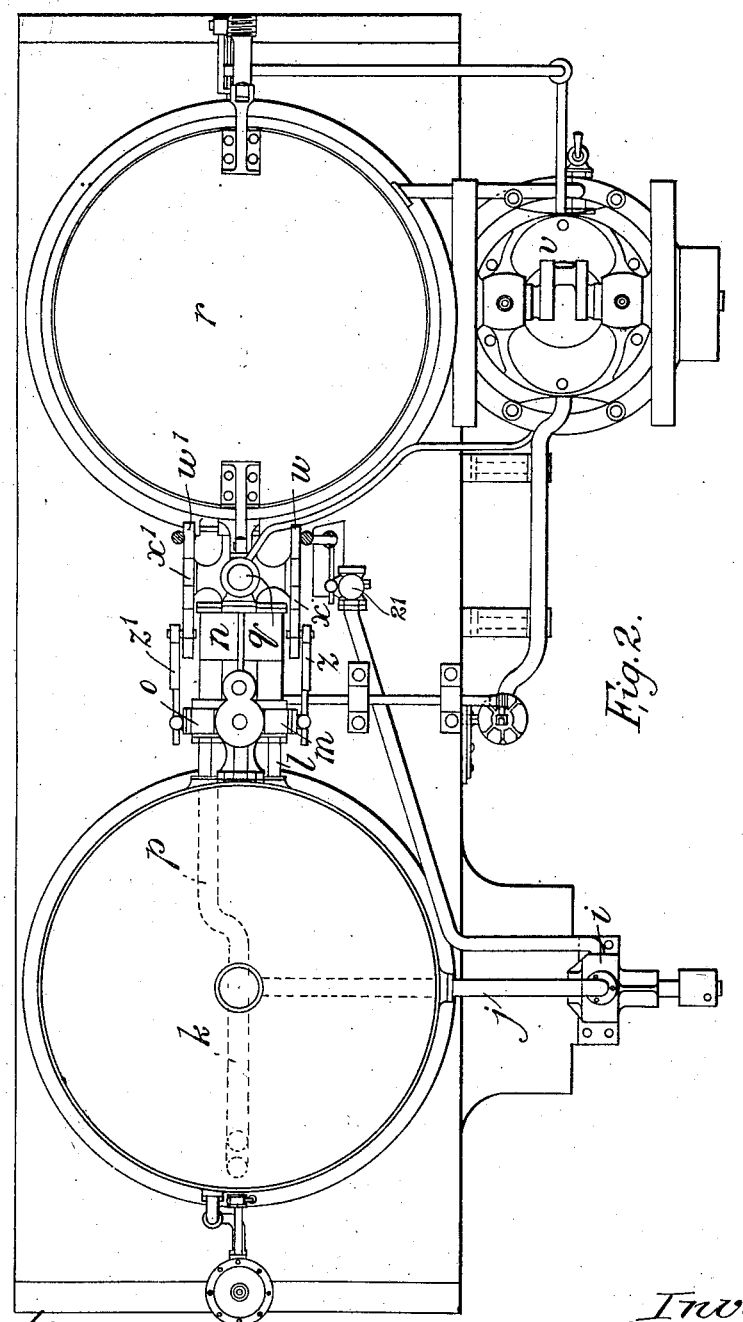
Figure 3:
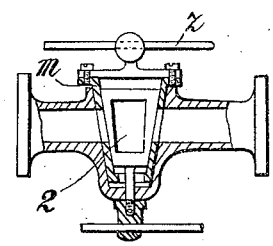
Figure 4:
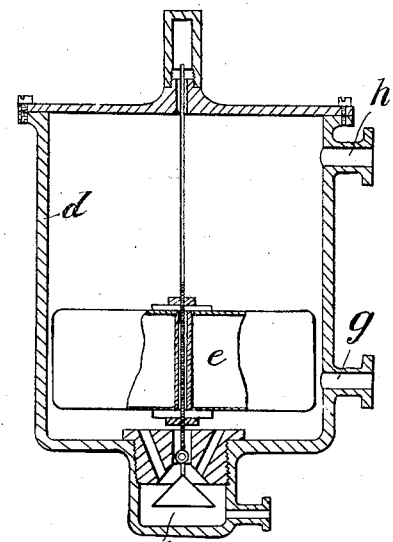
Figure 5:
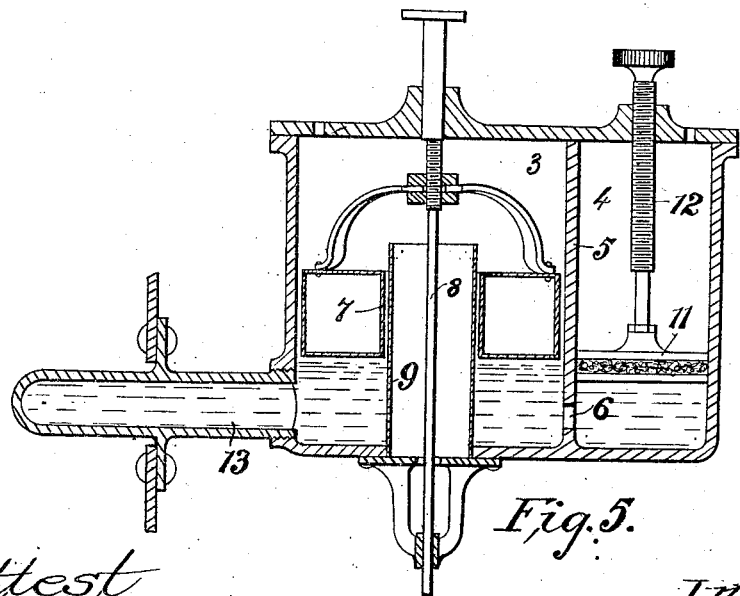

Figure 1 is a part-sectional elevation of a carbureted-air-producing plant according to the invention. Fig. 2 is a plan of the same. Fig. 3 is a diagrammatical sectional plan of a double valve according to the invention. Fig. 4 is a vertical section of an oil-supply chamber, and Fig. 5 is a vertical section through the center of a thermostat according to the invention.

In carrying out the invention in one manner a hot-water jacketed carbureted-air-producing plant is provided having a carbureter $a$ provided with a series of vertical baffles $b$, of absorbent material. Oil from an overhead tank $c$ is supplied to the under part of an oil-chamber $d$, (see Fig. 4,) in which is a float $e$, controlling the oil-inlet valve $f$. The oil-chamber is connected by cock-controlled pipes $g$ and $h$, the latter of which serves as a pressure-equalizing pipe. Air from a blower $i$, actuated by a heat-engine $v$, is delivered by pipe $j$ and branch $k$ to the carbureter, whence it passes through the absorbent baffles $b$, thereby becoming carbureted, and flows by pipe $l$ through valve $m$ (see Fig. 3) into a mixing-box $n$, to which fresh air is delivered by a branch $p$ (see Fig. 2) through a similar valve $o$. From the mixing-box the mixture passes through valve $q$ into a water-sealed gas-holder $r$. The mixture is supplied to the services from the gas-holder by pipe $s$ and outlet $t$, as required.

The bell is provided with a vertically-guided rod $u$, which engages with one end $w$ of a slotted lever which is secured to the spindle of the valve $q$, whereby that valve may be opened more or less in any well-understood manner. The other end $x$ of the lever is provided with a long slot $y$, in which one end of a lever-rod $z$ is pivotally secured to a block which may be set to and secured in any desired position in the slot. The lever-rod $z$ is passed loosely through a hole in the end of the spindle of the rich-gas valve $m$. The movements of the bell thus effect, through the slotted lever and rod, the control of the mixture-valve $q$ and the gas-valve $m$. The effective length of the lever-rod $z$ may be varied to give the desired amount of movement of the gas-valve $m$ in relation to that of the mixture-valve $q$. The pure-air valve $o$ is also similarly operated by a rod $z'$ of adjustable effective length and a slotted lever $w'$ $x'$, actuated by the movement of the gas-bell.

So long as the temperature remains fairly constant these two valves $m$ and $o$ maintain a practically constant proportion of hydrocarbon to air in the mixture notwithstanding variations in the demand. The valves $m$ and $o$, however, operate in opposite directions to each other, so that when a large quantity of gas is being consumed the falling of the bell opens the gas-valve $m$ wider and partially closes the air-valve $o$, thus allowing a larger volumetric proportion of gas, which, owing to the increased speed of flow and larger volume of air passing through the carbureter, contains less hydrocarbon per unit volume to mix in the mixing-chamber with the air from the auxiliary supply. When the consumption of gas is decreased, the holder rises or expands and operates the gas and air valves in the opposite direction to that above stated, so as to admit more air and less gas in the required ratio, whereby the hydrocarbon and air forming the mixture are maintained in the same proportion as before. Suppose, for example, that the required proportion of hydrocarbon to air be one and one-half to ninety-eight and one-half. Should the demand now increase to the maximum capacity of the plant, the gas passing through valve $m$ becomes weak and only requires a small amount of air to be added from the air-valve $o$, a large proportion of the ninety-eight and one-half per cent. of air required being passed through the carbureter and valve $m$. Under light load, say, ninety per cent. of the air is passed through the air-valve $o$; but under heavy load the conditions would be reversed and, say, ninety per cent. would pass through the gas-valve $m$.

In order to maintain the proportion of hydrocarbon to air constant when the temperature of the atmosphere varies considerably or the temperature in the carbureter changes, I provide either the auxiliary air or the gas pipe with a valve controlled by a thermostat adapted to be actuated by changes of temperature. The valve may conveniently consist of a cock 2, (see Fig. 3,) concentrically within the plug of the cock or valve $m$ and having ports adapted to register under normal conditions with the ports in the valve $m$. The thermostat for operating this valve may consist of two chambers 3 and 4, (see Fig. 5,) separated by a partition 5, having a communicating passage 6 in its bottom. Mercury is supplied to the chambers, and in the chamber 3 is a float 7, which supports a rod 8, passing through a tubular opening 9 in the bottom of the chamber and connected to an arm on the spindle of the cock 2. In the other chamber 4 is a well-fitting piston 11, having a screwed spindle 12, by means of which the piston may be moved up and down to adjust the height of mercury in the chamber 3, as required. A tubular portion 13 projects horizontally from the chamber 3 into the carbureter. As the temperature of the atmosphere and the temperature within the carbureter varies the volume of mercury varies, and the float is raised or lowered accordingly, thereby controlling the amount of opening of the cock 2, so as to maintain the proportion of hydrocarbon to air in the mixture practically constant. Thus if the temperature rise the gas will be richer, and the gas-valve must be partially closed; but if the temperature fall the gas going to the mixing-chamber will be poorer and the gas-valve must be opened more.

In some cases the float of the thermostat may be employed to act as a valve to close more or less the conduit through which the gas or air passes. This method of control may be used independently of the automatic method of gas and air valve control hereinbefore described and in conjunction with other methods of controlling the proportion of hydrocarbon to air. Even, for example, in small plants, where hand-actuated gas and air valves are used for controlling the proportion, the thermostatic control may be used to assist the hand-control.

In addition to the thermostatic governing above described another thermostat may be employed actuated by variations in the flame of the gas generated by the plant. This thermostat may consist of a closed drum or annular chamber 14, Fig. 1, containing air or other suitable elastic fluid, the chamber being connected by a pipe 15 to a cylinder 16, in which is a spring pressing against the closely-fitting piston 17 or diaphragm. The piston or diaphragm is connected by a rod 18 to a bell-crank lever 19, adapted to actuate a cock similar to that described with reference to Fig. 3, situated concentrically within the auxiliary air-valve $o$.

A burner 20, consuming gas generated by the plant, is lighted below the annular chamber 14, the total heat of this flame, according to the proportion of hydrocarbon it contains, becoming greater or less as the gas generated becomes richer or poorer within certain limits. Should the mixture vary and a richer gas be generated, a larger flame and higher temperature is the result, giving a greater expansion of the medium within the annular chamber, whereby the piston or diaphragm is forced farther out against the spring, and the cock is slightly turned so as to increase the volume of air passing to the mixing-chamber, and consequently correct the proportion of air to hydrocarbon in the mixture.

When the correct proportion has been obtained, the spring or a weight forces the piston or diaphragm back to its normal position, and should the temperature become poorer the medium, owing to loss of temperature in the flame, contracts and the spring or weight forces the piston or diaphragm lower than its normal, thus operating the cock in the reverse direction. In cases where a heat-engine supplied with gas generated by the plant is employed for driving the blowers the air-chamber may be heated by the same flame as is used for the engine.

In small plants for producing carbureted air it is usually unnecessary to employ a thermostat actuated in accordance with variations in the flame temperature, since the engine when actuated by a flame of the gas generated by the plant usually itself acts as a governor, its speed increasing when the gas is too rich, and consequently blowing a larger volume of air of increased pressure through the apparatus, whereby the valves are operated and the proportion is brought back to its normal. In larger plants, however, it is much better to employ valves for counteracting considerable change of temperature, and if these valves be not actuated by thermostats, as described, they may be actuated by hand, as required.

The apparatus is provided with an air-relief valve 21, actuated by the rise and fall of the gas-bell, so that in the event of the demand suddenly ceasing or becoming much reduced the lift of the bell shall allow an escape of air, and thus prevent excess of air.

It will be understood that instead of employing a gas-holder for actuating a valve or valves whereby the proportion of hydrocarbon to air is kept constant any other suitable means may be employed actuated by fluctuation in the demand for the mixture produced.

The hot-water jacket 30 surrounds the carbureter. The jacket is connected by pipes 31 and 32 with the tank to the bell. The cylinder-jacket is put in circulation with the tank of the bell by means of the pipes 33 and 34, the latter pipe being connected to a valve 35, situated in the pipe 32. This valve is operated from the bell-rod $u$ by means of the lever 36 in such a manner that as the demand for mixture decreases the valve 35 is closed more or less and the supply of hot water to the jacket is reduced, the opposite action taking place when the demand increases.

The mixture-delivering pipe t is connected by a small pipe 37 to the burner 20, and in this pipe 37 a valve 38 is provided. This valve is actuated from a rod 39, attached to the bell, the supply of mixture to the burner being controlled thereby in accordance with the demand, as will be readily understood.

Having thus described my invention, what I claim as new, and desire to secure by Letters Patent, is—

1. In combination in a plant for producing carbureted air, a carbureted-air-supply pipe, a pure-air-supply pipe, a plurality of valves located in said pipes, a mixing-chamber with which the carbureted-air-supply pipe and the pure-air-supply pipe connect, a bell a pipe for delivering the mixture from the mixing-chamber to the bell and means connected to said bell in conjunction with thermostatically-controlled means whereby the valves are actuated to vary in accordance with the demand for mixture and changes of temperature the relative volumes of carbureted air and air delivered to the mixing-chamber so as to keep the proportion of hydrocarbon in the mixture constant.

2. In combination in a plant for producing carbureted air, a carbureted-air-supply pipe, a pure-air-supply pipe, a plurality of valves in each pipe, a mixing-chamber with which both of said pipes connect, a gas-bell, a pipe leading thereto from the mixing-chamber, means connecting one valve in each pipe with the gas-bell, a thermostat controlled by the changes of temperature, means connecting a valve in one of the pipes with the thermostat, means for producing a gas-flame connected with the bell, means for controlling the remaining valve in the other pipe from the gas-flame whereby the proportion of hydrocarbon to air in the mixture is kept constant, substantially as described.

3. In combination in a plant for producing carbureted air, a carbureter, a gas-bell, a carbureted-air-supply pipe, a pure-air-supply pipe and a mixing-chamber into which both pipes deliver, a plurality of valves in one pipe and a single valve in the other pipe, means actuated from the rise or fall of the bell for controlling one of said valves in each pipe, a thermostat consisting of closed chamber containing fluid, means for heating the fluid by some of the gas produced by the apparatus, a movable member in said chamber, a connection between said movable member and the other of said valves, substantially as and for the purpose described.

4. In combination in a plant for producing carbureted air, a carbureter, a gas-bell, a mixing-chamber, a carbureted-air pipe from the carbureter and a pure-air pipe, both pipes delivering into the mixing-chamber, a thermostatically-controlled valve in each pipe and another valve in each pipe controlled by the rise and fall of the gas-bell, substantially as described.

5. In combination in a plant for producing carbureted air, a carbureted-air-supply pipe, a pure-air-supply pipe, a valve in each pipe, an additional valve in one of said pipes, a thermostat connected to said additional valve and adapted to operate by changes of atmospheric temperature, a mixing-chamber with which both the carbureted-air pipe and the pure-air-supply pipe connect, a bell a pipe for conveying the mixture thereto from the mixing-chamber and means connected to the said bell whereby the carbureted-air valve and the pure-air valve are actuated to vary with the demand for mixture the relative volumes of carbureted air and air delivered to the mixing-chamber, substantially as described.

In testimony whereof I have signed my name to this specification in the presence of two subscribing witnesses.

THOMAS HENRY GLASSCOE.

Witnesses:
P. M. DAVIES,
BERTRAM H. MATTHEWS.